US011023056B2

(12) United States Patent
Lai

(10) Patent No.: US 11,023,056 B2
(45) Date of Patent: Jun. 1, 2021

(54) ANTENNA STRUCTURE AND STYLUS USING SAME

(71) Applicant: Chiun Mai Communication Systems, Inc., New Taipei (TW)

(72) Inventor: Chih-Hung Lai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 87 days.

(21) Appl. No.: 16/423,570

(22) Filed: May 28, 2019

(65) Prior Publication Data

US 2019/0391674 A1 Dec. 26, 2019

(30) Foreign Application Priority Data

Jun. 21, 2018 (CN) .......................... 201810645133.2

(51) Int. Cl.
*G06F 3/0354* (2013.01)
*H01Q 1/24* (2006.01)
*G06F 1/16* (2006.01)

(52) U.S. Cl.
CPC ........ *G06F 3/03545* (2013.01); *G06F 1/1698* (2013.01); *H01Q 1/243* (2013.01)

(58) Field of Classification Search
CPC .. G06F 3/03545; G06F 3/0383; G06F 1/1626; G06F 3/0442; G06F 2203/04105; G06F 3/041; G06F 3/0412; G06F 3/046; G06F 1/1698; G06F 2203/0384; G06F 1/1683; G06F 1/1656; H04B 10/40; H04B 10/50; H04B 10/60; H04B 1/0053; H04B 5/0075; H04B 3/548; H04B 7/04; H04B 7/0691; H01Q 1/243; H01Q 21/28; H01Q 1/44; H01Q 7/00; H01Q 5/35; H01Q 5/10; H01Q 5/328; H01Q 9/30; H01Q 13/106; H01Q 1/2291; H01Q 3/247; H01Q 1/48;

(Continued)

(56) References Cited

U.S. PATENT DOCUMENTS 6,498,586 B2 * 12/2002 Pankinaho ............. H01Q 1/243
                                                            343/700 MS
2013/0234998 A1 * 9/2013 Wang ....................... H01Q 1/52
                                                            345/179

(Continued)

FOREIGN PATENT DOCUMENTS

CN     203553348 U     4/2014
CN     206049114 U     3/2017
CN     206411627 U     8/2017

*Primary Examiner* — Duc Q Dinh
(74) *Attorney, Agent, or Firm* — ScienBiziP, P.C.

(57) ABSTRACT

An antenna structure applied in a stylus includes a first radiating portion, a second radiating portion, and a main body. The second radiating portion corresponds to the first radiating portion. The main body covers the first radiating portion and the second radiating portion. The first radiating portion electrically connects to a feed source to feed in current, the first radiating conducts the current to activate a first mode to generate radiating signals, the main body couples the current from the first radiation portion, the second radiating portion couples the current from the main body, the first radiating portion, the main body, and the second radiating portion conduct the current and connect to ground to activate a second mode to generate radiation signals. A stylus using the antenna structure is also provided.

17 Claims, 7 Drawing Sheets

(58) Field of Classification Search
CPC .. H01Q 1/50; H01Q 5/00; H01Q 5/50; H01Q 9/0407; H01Q 1/38; H01Q 1/46; H01Q 13/08; H01Q 21/0006; H01Q 21/00
USPC ..... 345/179; 178/18.01, 18.07, 19.01, 19.02, 178/19.07, 19.03
See application file for complete search history.

(56) References Cited

U.S. PATENT DOCUMENTS

| | | | |
|---|---|---|---|
| 2015/0061952 A1* | 3/2015 | Chiang | H01Q 5/371 343/749 |
| 2015/0363013 A1* | 12/2015 | Coutts | H01Q 1/44 345/179 |
| 2017/0010697 A1 | 1/2017 | Jiang et al. | |
| 2019/0265808 A1* | 8/2019 | Zhang | G06F 3/0383 |

* cited by examiner

ANTENNA STRUCTURE AND STYLUS USING SAME

FIELD

The subject matter herein generally relates to an antenna structure and a stylus using the antenna structure.

BACKGROUND

Portable electronic devices, such as mobile phones, tablet computers, and personal digital assistants (PDAs), may include a stylus for operating a touch display. A size of the stylus is small for conveniently being carried with the portable electronic device. However, the small size of the stylus limits a radiating performance of an antenna thereof, and such antenna is normally designed as a single frequency band antenna. A dual frequency band from such antenna is problematic. In addition, the small size of the stylus limits a height of the antenna and a design of clearance zone of the antenna, therefore, a radiating efficiency of the antenna is affected.

BRIEF DESCRIPTION OF THE DRAWINGS

Implementations of the present disclosure will now be described, by way of example only, with reference to the attached figures.

DETAILED DESCRIPTION

Figure 1:
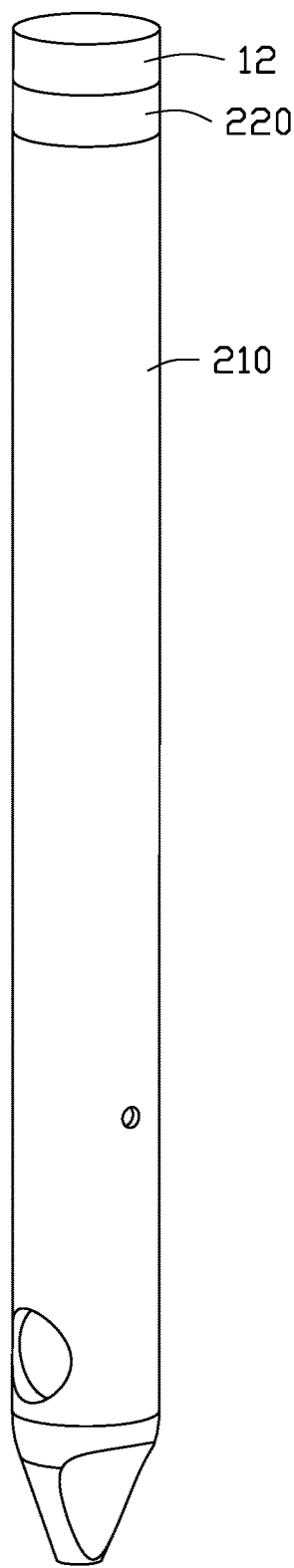
FIG. 1 is an isometric view of an embodiment of a stylus using an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a stylus using the antenna structure.

Figure 2:
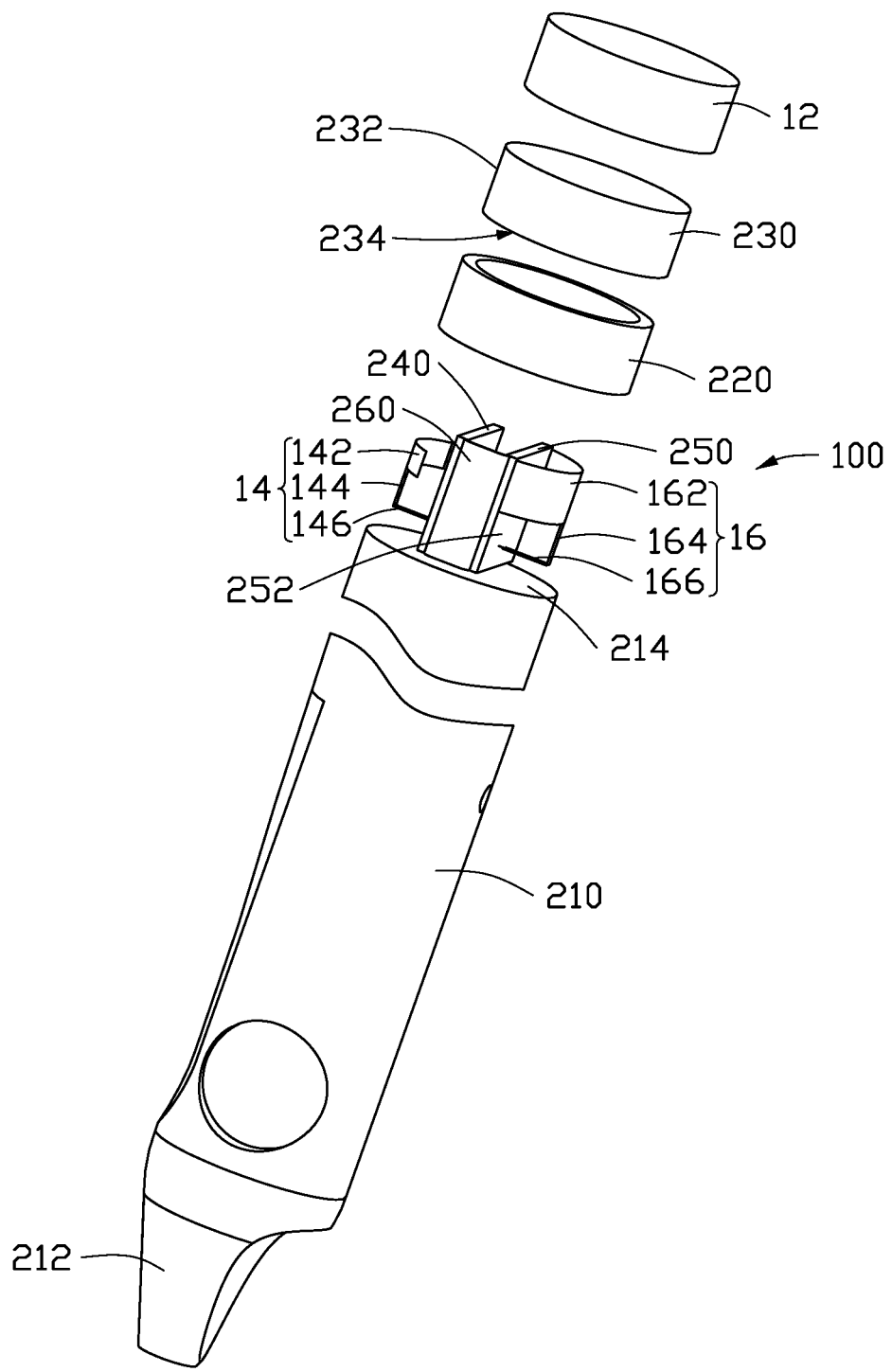
FIG. 2 is an exploded view of an embodiment of the stylus of FIG. 1.

FIGS. 1 and 2 illustrate an exemplary embodiment of an antenna structure 100 applied in a stylus 200. The antenna structure 100 is configured to transmit and receive radio waves to transmit and exchange wireless signals. The stylus 200 can also operate on a touch display of portable electronic devices, for example, mobile phones, tablet computers, and personal digital assistants (PDAs).

Figure 3:
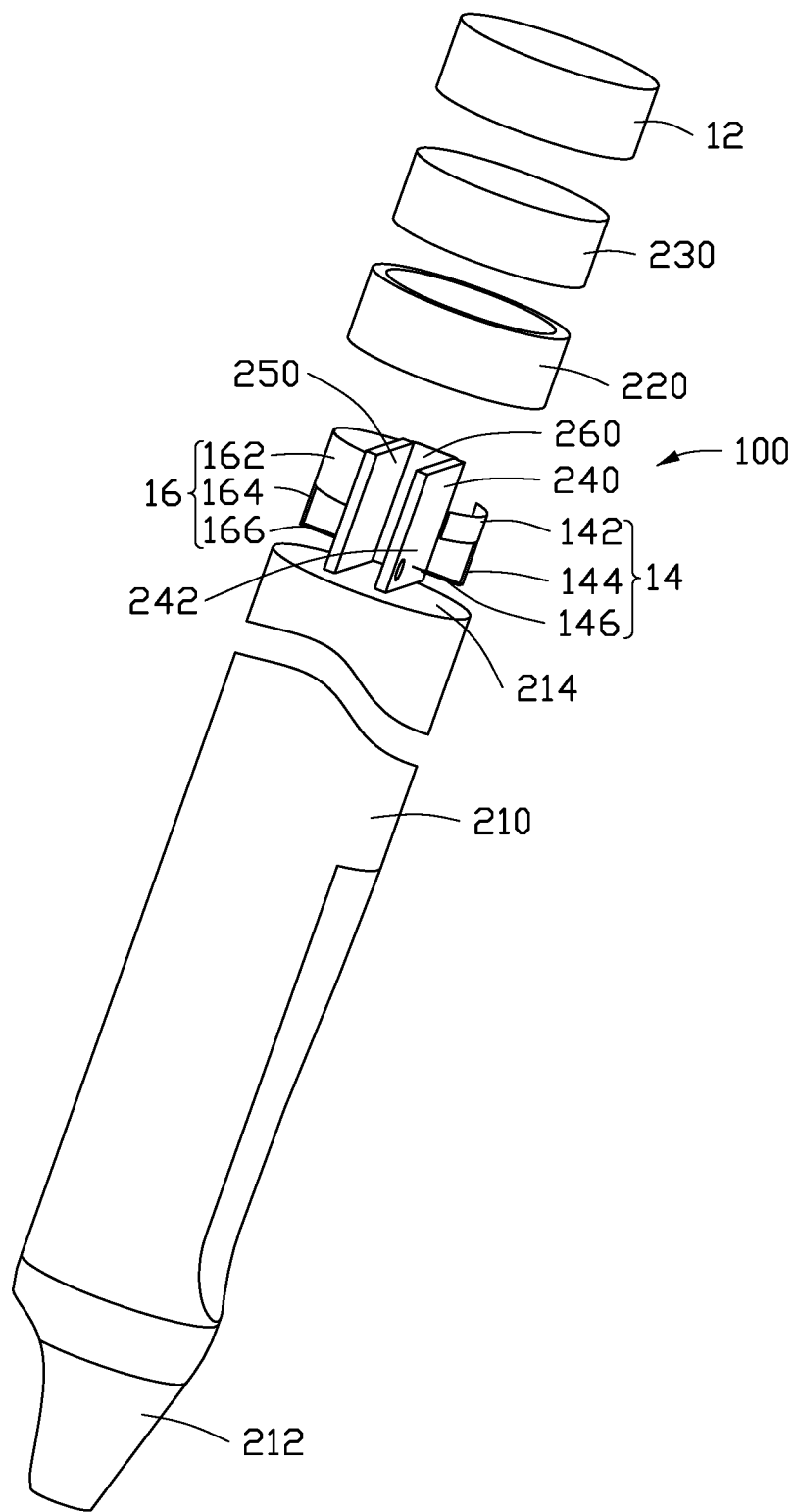
FIG. 3 is another exploded view of an embodiment of the stylus of FIG. 2.

Referring to FIGS. 2 and 3, the stylus 200 includes the antenna structure 100, a shaft 210, a ring 220, a cover 230, a first circuit board 240, a second circuit board 250, and a connecting wire 260.

The shaft 210 is substantially a cylinder and includes a first end 212 and a second end 214 opposite to the first end 212. In at least one embodiment, the first end 212 is a nib of the stylus 200 and configured to operate on the touch display of the portable electronic devices. The first end 212 is substantially cone-shaped. The second end 214 is substantially a circular plane and configured to support the antenna structure 100, the ring 220, the cover 230, the first circuit board 240, the second circuit board 250, and the connecting wire 260.

The ring 220 is substantially a cylindrical ring and coupled to the second end 214 along an extending direction of the shaft 210. The ring 220 is made of any insulation material, such as can be but is not limited to plastic.

The cover 230 is substantially a hollow cylindrical isolation cover and coupled to an end of the ring 220 away from the second end 214 along an extending direction of the shaft 210. The cover 230 is made of any insulation material, such as can be but is not limited to plastic. The cover 230 includes an external wall 232 and an inner wall 234.

Figure 4:
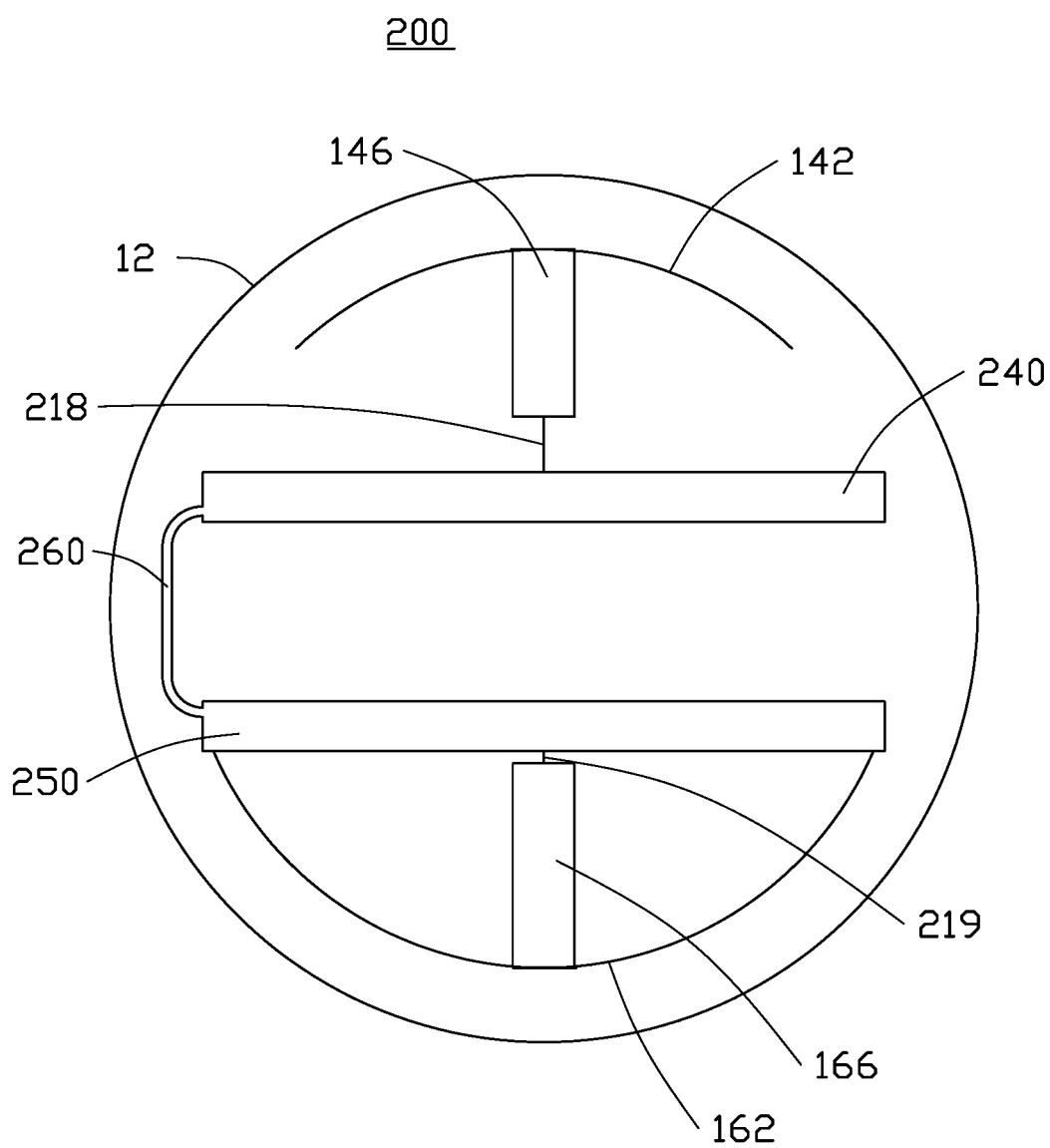
FIG. 4 is a planar view of an embodiment of the antenna structure of FIG. 2.

Referring to FIGS. 2, 3, and 4, the first circuit board 240 and the second circuit board 250 are in parallel and spaced from each other. The first circuit board 240 and the second circuit board 250 are perpendicularly coupled to the second end 214. The connecting wire 260 is electronic connected between the first circuit board 240 and the second circuit board 250. The first circuit board 240 and the second circuit board 250 may include power sources, ground connections, processors, storages, and radio-frequency circuits to execute wireless communication functions for the stylus 200. In addition, each of the first circuit board 240 and the second circuit board 250 may further includes a clearance zone for the antenna structure 100.

Referring to FIGS. 2 and 3, the antenna structure 100 includes a main body 12, a first radiating portion 14, and a second radiating portion 16.

The main body 12 is substantially a hollow cylindrical cover. The main body 12 and the cover 230 are substantially in a same shape and size. The main body 12 covers the external wall 232 of the cover 230. In at least one embodiment, a diameter of the main body 12 is substantially equal to an external diameter of the ring 220 and an external diameter of the shaft 210. Therefore, the shaft 210, the ring 220, and the main body 12 cooperatively form a long continuous cylinder.

The first radiating portion 14 includes a first arm 142, a second arm 144, and a third arm 146 connected in that order. The first arm 142 is substantially a circular arc. The first arm 142 is arranged on the inner wall 234 of the cover 230 and parallel to the cylinder portion of the main body 12. One end of the second arm 144 is perpendicularly connected to a middle portion of the first arm 142 and extends along an extending direction of the shaft 210. One end of the third arm 146 is perpendicularly connected to the other end of the second arm 144 that is away from the first arm 142. The third arm 146 is parallel to a surface of the second end 214 and spaced apart from the first circuit board 240. The other end of the third arm 146 that is away from the second arm 144 is electrically connected to a feed source 242 (shown in FIG. 5) of the first circuit board 240 through a microstrip line 218 (shown in FIG. 4), thus to feed in current from the first circuit board 240. The first radiating portion 14 corresponds to the clearance zone of the first circuit board 240.

The second radiating portion 16 includes a fourth arm 162, a fifth arm 164, and a sixth arm 166 connected in that order. The fourth arm 162 is substantially a circular arc. A length of the fourth arm 162 is longer than a length of the first arm 142, and a width of the fourth arm 162 is wider than a width of the first arm 142. The fourth arm 162 is arranged on the inner wall 234 of the cover 230 and is parallel to the cylinder portion of the main body 12. One end of the fifth arm 164 is perpendicularly connected to a middle portion of the fourth arm 162 and extends along an extending direction of the shaft 210. One end of the sixth arm 166 is perpendicularly connected to the other end of the fifth arm 164 that is away from the fourth arm 162. The sixth arm 166 is parallel to a surface of the second end 214 and spaced apart from the second circuit board 250. The other end of the sixth arm 166 that is away from the fifth arm 164 is electrically connected to a ground of the second circuit board 250 through a microstrip line 219 (shown in FIG. 4), for grounding the second radiating portion 16. The second radiating portion 16 corresponds to the clearance zone of the second circuit board 250.

The clearance zones of the antenna structure 100 include a first clearance zone 242 and a second clearance zone 252. The first clearance zone 242 is arranged on the first circuit board 240. In at least one embodiment, the first clearance zone 242 is arranged between the end of the first circuit board 240 that is away from the second end 214 and the third arm 146. The second clearance zone 252 is arranged on the second circuit board 250. In at least one embodiment, the second clearance zone 252 is arranged between the end of the second circuit board 250 that is away from the second end 214 and the sixth arm 166. The first clearance zone 242 and the second clearance zone 252 are areas on the first circuit board 240 and the second circuit board 250 which contain no conductors, such as metal materials. In at least one embodiment, the first clearance zone 242 and the second clearance zone 252 have a same size and shape.

Figure 5:
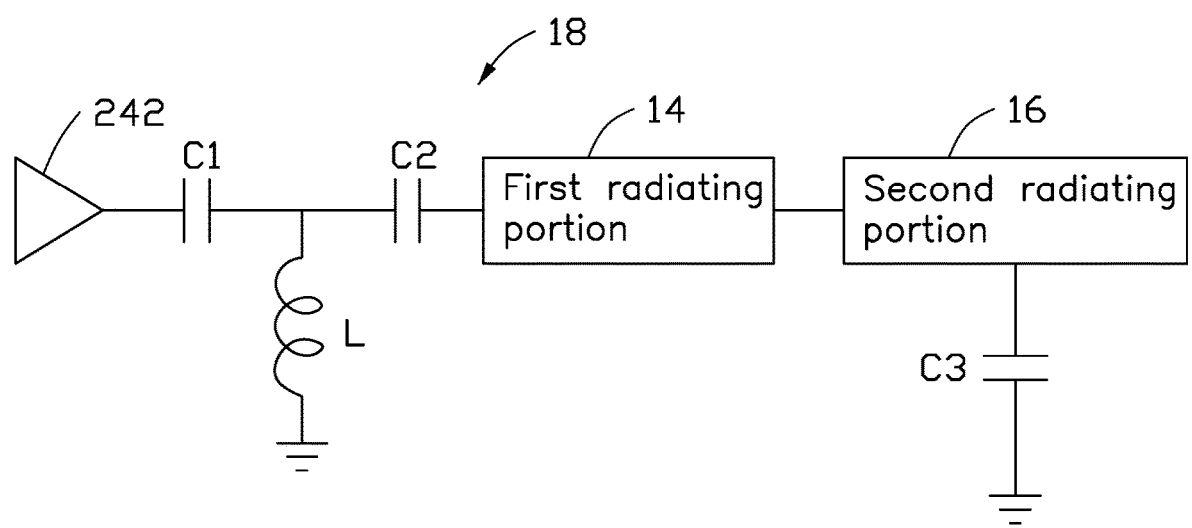
FIG. 5 is a circuit diagram of an embodiment of a matching circuit of the antenna structure of FIG. 2.

Referring to FIG. 5, the antenna structure 100 further includes a matching circuit 18. The matching circuit 18 includes a first capacitor C1, an inductor L, a second capacitor C2, and a third capacitor C3. The first capacitor C1, the inductor L, and the second capacitor C2 are arranged on the first circuit board 240. The third capacitor C3 is arranged on the second circuit board 250. One end of the first capacitor C1 is electrically connected to the feed source 242 of the first circuit board 240, the other end of the first capacitor C1 is electrically connected to one end of the second capacitor C2. The other end of the second capacitor C2 is electrically connected to the first radiating portion 14 through the microstrip line 218 (shown in FIG. 4). One end of the inductor L is electrically connected between the first capacitor C1 and the second capacitor C2, the other end of the inductor L is connected to ground. One end of the third capacitor C3 is electrically connected to the second radiating portion 16, the other end of the third capacitor C3 is connected to the ground. In at least one embodiment, a resistance value of the first capacitor C1 is about 0.4 picofarads (pF), a resistance value of the inductor L is about 3.2 nanohenrys, a resistance value of the second capacitor C2 is about 1.3 picofarads, and resistance value of the third capacitor C3 is about 0.25 picofarads.

The first arm 142 feeds in current from the feed source 242 of the first circuit board 240 through the matching circuit 18. The current flows through the first arm 142, the second arm 144, and the third arm 146, thus to activate a first mode to generate radiation signals in a first frequency band. In at least one embodiment, the first mode is a WI-FI 2.4G operation mode, while the first frequency band is a frequency band of about 2400-2485 MHz. Therefore, the first radiating portion 14 forms a monopole antenna to activate the first mode. Additionally, the first arm 142 feeds in current from the feed source 242 of the first circuit board 240 through the matching circuit 18. The current flows through the first radiating portion 14, and a portion of the main body 12 corresponding to the first radiating portion 14 couples the current. The current flows to a portion of the main body 12 corresponding to the second radiating portion 16, the second radiating portion 16 further couples the current from the portion of the main body 12 corresponding to the second radiating portion 16. The current flows through the second radiating portion 16, thus activating a second mode to generate radiation signals in a second frequency band. In at least one embodiment, the second mode is a WI-FI 5G operation mode, while the second frequency band is a frequency band of about 5180-5800 MHz. Therefore, the first radiating portion 14, the main body 12, and the second radiating portion 16 cooperatively form a loop antenna to activate the second mode.

In at least one embodiment, a length of the stylus 200 is about 150 millimeters, a length of the ring 220 is about 5 millimeters, and a length of the main body 12 is about 5 millimeters. The diameter of the main body 12, the external diameter of the ring 220, and the external diameter of the shaft 210 are all about 14 millimeters. The sizes of the clearance zones of the first circuit board 240 and the second circuit board 250 are similar, at about 7 millimeters.

Figure 6:
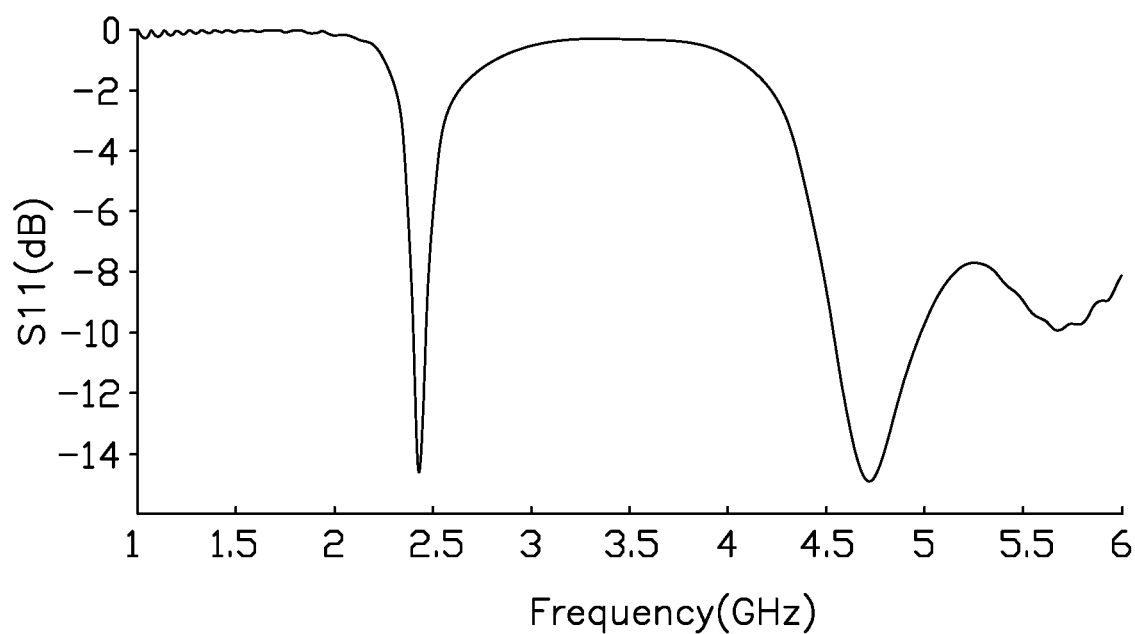
FIG. 6 is a return loss (RL) graph of an embodiment when the antenna structure is in operating.

FIG. 6 illustrates a return loss (RL) graph of the antenna structure 100 in operation. When the antenna structure 100 operates at the WI-FI 2.4G frequency band of 2400-2485 MHz and the WI-FI 5G frequency band of 5180-5800 MHz a working frequency satisfies a design of the antenna and also has a good radiating efficiency.

Figure 7:
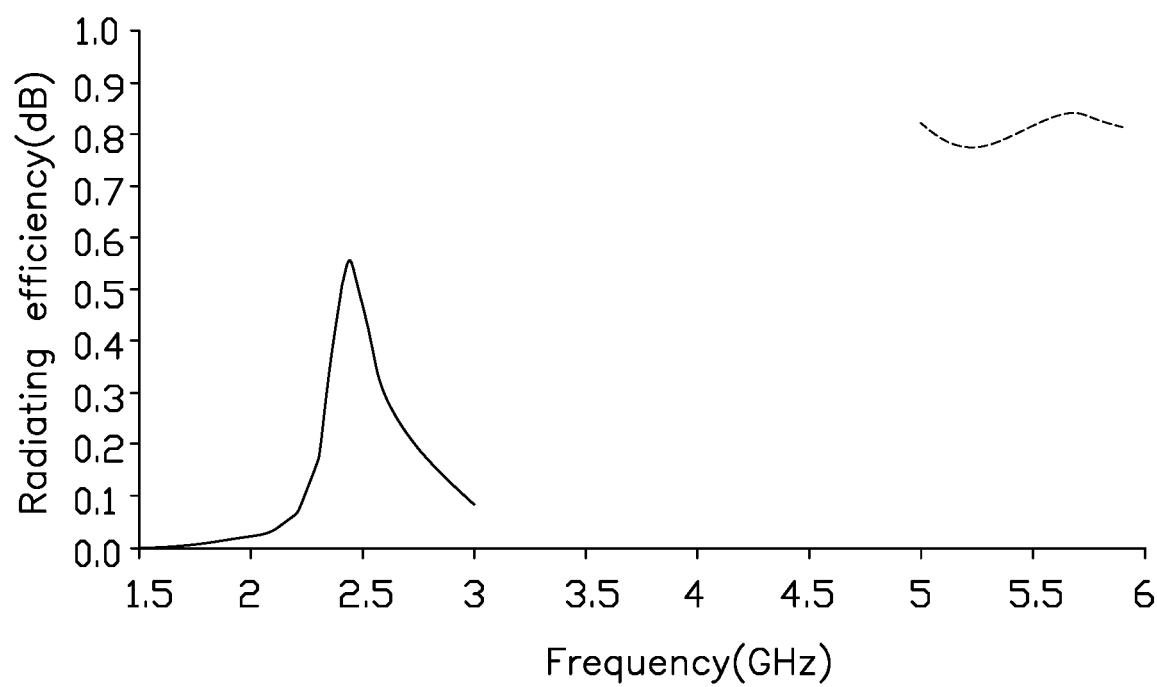
FIG. 7 is a radiating efficiency graph of an embodiment when the antenna structure is in operating.

FIG. 7 illustrates a radiating efficiency graph of the antenna structure 100 in operation. When the antenna structure 100 operates at the WI-FI 2.4G frequency band of 2400-2485 MHz, the radiating efficiency of the antenna structure 100 is about −3 decibels (dB) and 50%. When the antenna structure 100 operates at the WI-FI 5G frequency band of 5180-5800 MHz, the radiating efficiency of the antenna structure 100 is about −0.97 dB and 80%.

In conclusion, when the antenna structure 100 can thus operate at the WI-FI 2.4G frequency band and the WI-FI 5G frequency band, the working frequencies satisfy a design of the antenna and also have a good radiating efficiency.

The stylus 200 includes the first radiating portion 14, the second radiating portion 16, and the main body 12 mounted in a space of the second end 214 to forms a dual-band antenna, with improved bandwidth and good radiating efficiency. Therefore, radiating performance of the stylus 200 is improved.

The embodiments shown and described above are only examples. Many details are often found in the art such as the other features of the antenna structure and the stylus. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure applied in a stylus, the antenna structure comprising:
   a first radiating portion;
   a second radiating portion corresponding to the first radiating portion; and
   a main body covering the first radiating portion and the second radiating portion;
   wherein the first radiating portion electrically connects to a feed source to feed in current, the first radiating portion conducts the current to activate a first mode to generate radiating signals, the main body couples the current from the first radiation portion, the second radiating portion couples the current from the main body, and
   the first radiating portion, the main body, and the second radiating portion conduct the current and connect to ground to activate a second mode to generate radiation signals.

2. The antenna structure of claim 1, wherein the main body is a hollow cylindrical cover, the main body covers to an end of a shaft of the stylus.

3. The antenna structure of claim 2, wherein the first radiating portion comprises a first arm, a second arm, and a third arm connected in that order, the first arm is a circular arc and parallel to the main body, one end of the second arm is perpendicularly connected to a middle portion of the first arm, one end of the third arm is perpendicularly connected to the other end of the second arm that is away from the first arm, the other end of the third arm that is away from the second arm is electrically connected to the feed source for feeding in the current from the feed source.

4. The antenna structure of claim 3, wherein the second radiating portion comprises a fourth arm, a fifth arm, and a sixth arm connected in that order, the fourth arm is a circular arc and parallel to the main body, one end of the fifth arm is perpendicularly connected to a middle portion of the fourth arm, one end of the sixth arm is perpendicularly connected to the other end of the fifth arm that is away from the fourth arm, the other end of the sixth arm that is away from the fifth arm is electrically connected to ground.

5. The antenna structure of claim 4, wherein the antenna structure further comprises a matching circuit, the matching circuit comprises a first capacitor, an inductor, a second capacitor, and a third capacitor, one end of the first capacitor is electrically connected to the feed source, the other end of the first capacitor is electrically connected to one end of the second capacitor; the other end of the second capacitor is electrically connected to the first radiating portion; one end of the inductor is electrically connected between the first capacitor and the second capacitor, the other end of the inductor is connected to ground; one end of the third capacitor is electrically connected to the second radiating portion, the other end of the third capacitor is connected to ground.

6. The antenna structure of claim 1, wherein the first mode is a WI-FI 2.4G operation mode, the second mode is a WI-FI 5G operation mode, a frequency band of the radiation signals generated by the second mode is greater than a frequency band of the radiation signals generated by the first mode.

7. A stylus applied for portable electronic devices, the stylus comprising:
   a shaft; and
   an antenna structure arranged on an end of the shaft, the antenna structure comprising:
      a first radiating portion;
      a second radiating portion corresponding to the first radiating portion; and
      a main body covering the first radiating portion and the second radiating portion;
   wherein the first radiating portion electrically connects to a feed source to feed in current, the first radiating portion conducts the current to activate a first mode to generate radiating signals, the main body couples the current from the first radiation portion, the second radiating portion couples the current from the main body, and
   the first radiating portion, the main body, and the second radiating portion conduct the current and connect to ground to activate a second mode to generate radiation signals.

8. The stylus of claim 7, wherein the stylus further comprising a ring and a cover, the ring is a cylindrical ring and coupled to the end of the shaft along an extending direction of the shaft, the ring is made of insulation material; the cover is a hollow cylindrical cover and coupled to an end of the ring away from the end of the shaft along an extending direction of the shaft, the cover is made of insulation material.

9. The stylus of claim 8, wherein the stylus further comprises a first circuit board, a second circuit board, and a connecting wire; the first circuit board and the second circuit board are in parallel and spaced form each other, the first circuit board and the second circuit board are perpendicularly coupled to the end of the shaft; the connecting wire is electronic connected between the first circuit board and the second circuit board; each of the first circuit board and the second circuit board further comprises a clearance zone for the antenna structure; the first circuit board comprises the feed source.

10. The stylus of claim 9, wherein the main body is a hollow cylindrical cover, the main body covers to an end of a shaft of the stylus.

11. The stylus of claim 10, wherein the first radiating portion comprises a first arm, a second arm, and a third arm connected in that order, the first arm is a circular arc and parallel to the main body, one end of the second arm is perpendicularly connected to a middle portion of the first arm, one end of the third arm is perpendicularly connected to the other end of the second arm that away from the first arm, the other end of the third arm that away from the second arm is electrically connected to the feed source for feeding in the current from the feed source.

12. The stylus of claim 11, wherein the second radiating portion comprises a fourth arm, a fifth arm, and a sixth arm connected in that order, the fourth arm is a circular arc and parallel to the main body, one end of the fifth arm is perpendicularly connected to a middle portion of the fourth arm, one end of the sixth arm is perpendicularly connected to the other end of the fifth arm that away from the fourth arm, the other end of the sixth arm that away from the fifth arm is electrically connected to ground.

13. The stylus of claim 12, wherein the antenna structure further comprises a matching circuit, the matching circuit comprises a first capacitor, an inductor, a second capacitor, and a third capacitor, one end of the first capacitor is electrically connected to the feed source, the other end of the first capacitor is electrically connected to one end of the second capacitor; the other end of the second capacitor is electrically connected to the first radiating portion; one end of the inductor is electrically connected between the first capacitor and the second capacitor, the other end of the inductor is connected to ground; one end of the third capacitor is electrically connected to the second radiating portion, the other end of the third capacitor is connected to ground.

14. The stylus of claim 13, wherein the clearance zone of the first circuit board is a first clearance zone, the clearance zone of the second circuit board is a second clearance zone; the first clearance zone is arranged on the first circuit board, the first clearance zone is arranged between the end of the first circuit board that away from the end of the shaft and the third arm; the second clearance zone is arranged on the second circuit board, the second clearance zone is arranged between the end of the second circuit board that away from the end of the shaft and the sixth arm; the first clearance zone and the second clearance zone are areas on the first circuit board and the second circuit board arranging no conductors; the first clearance zone and the second clearance zone have a same size and shape.

15. The stylus of claim 14, wherein the cover comprises an external wall and an inner wall, the main body and the cover are in a same shape and size, the main body covers to the external wall of the cover, a diameter of the main body is equal to an external diameter of the ring and an external diameter of the shaft, therefore, the shaft, the ring, and the main body cooperatively form a continuous cylinder.

16. The stylus of claim 15, wherein the first arm of the first radiating portion and the fourth arm of the second radiating portion are arranged on the inner wall of the cover.

17. The stylus of claim 7, wherein the first mode is a WI-FI 2.4G operation mode, the second mode is a WI-FI 5G operation mode, a frequency band of the radiation signals generated by the second mode is greater than a frequency band of the radiation signals generated by the first mode.

* * * * *